United States Patent
Chang et al.

(10) Patent No.: US 7,903,199 B2
(45) Date of Patent: Mar. 8, 2011

(54) BACKLIGHT MODULE HAVING LIGHT-MIXING MEMBER AND LIQUID CRYSTAL DISPLAY USING SAME

(75) Inventors: Li-Chun Chang, Miao-Li (TW); Wei-Hao Hung, Miao-Li (TW); Chun-Yun Pan, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 685 days.

(21) Appl. No.: 11/985,111

(22) Filed: Nov. 13, 2007

(65) Prior Publication Data

US 2008/0111951 A1 May 15, 2008

(30) Foreign Application Priority Data

Nov. 10, 2006 (TW) .............................. 95141765 A

(51) Int. Cl.
*G02F 1/1335* (2006.01)
(52) U.S. Cl. ............... 349/65; 349/62; 349/69; 362/609; 362/612; 359/333
(58) Field of Classification Search .............. 349/62–69; 359/333; 362/606, 612
See application file for complete search history.

(56) References Cited

U.S. PATENT DOCUMENTS

| 7,777,834 | B2 * | 8/2010 | Uehara et al. .................. 349/68 |
| 2004/0124764 | A1 * | 7/2004 | Suzuki et al. ................. 313/498 |
| 2006/0164858 | A1 | 7/2006 | Park et al. |
| 2007/0216992 | A1 * | 9/2007 | Tzeng et al. .................. 359/333 |
| 2008/0137335 | A1 * | 6/2008 | Tsai et al. ..................... 362/247 |
| 2009/0116261 | A1 * | 5/2009 | Chen et al. ................... 362/609 |

FOREIGN PATENT DOCUMENTS

| CN | 1797090 A | | 7/2006 |
| JP | 2005276734 A | * | 10/2005 |
| TW | 200610194 A | | 3/2006 |

* cited by examiner

*Primary Examiner* — Julie-Huyen L Ngo
(74) *Attorney, Agent, or Firm* — Wei Te Chung

(57) ABSTRACT

An exemplary backlight module (40) includes a number of point light sources (43) and a light-mixing member (47). The number of point light sources emit light beams of different colors. The light-mixing member mixes the light beams of different colors into white light beams. The light-mixing member includes a light entrance surface (470) opposite to the light sources. The light entrance surface includes a number of recesses (471). The recesses correspond to the number of point light sources. The backlight module has high efficiency of light mixing.

12 Claims, 3 Drawing Sheets

BACKLIGHT MODULE HAVING LIGHT-MIXING MEMBER AND LIQUID CRYSTAL DISPLAY USING SAME

The present invention relates to backlight modules and liquid crystal displays, and more particularly to a backlight module having a light-mixing member for improving color mixing of light produced by various light-emitting diodes.

GENERAL BACKGROUND

A typical liquid crystal display (LCD) includes a liquid crystal panel and a backlight module. The backlight module generally includes a reflection sheet, a light source, a diffuser, and a brightness enhancement film. The light source can include one or more cold cathode fluorescent lamps, or one or more light-emitting diodes (LEDs). A backlight module using LEDs as a light source can include three different types of LEDs, which emit red, green, and blue light beams respectively. After mixing of the color light beams emitted by the red, green, and blue LEDs, a white surface light source can be achieved. The white surface light source illuminates the liquid crystal panel.

Referring to FIG. 6, a typical LCD 2 includes a liquid crystal panel 24, a backlight module 20 adjacent to the liquid crystal panel 24, and a frame 21. The backlight module 20 is configured to illuminate the liquid crystal panel 24.

The frame 21 includes a bottom 211 and four side walls 212. The four side walls 212 are perpendicularly connected with the bottom 211, thereby forming an accommodating space. The accommodating space accommodates the backlight module 20 and the liquid crystal panel 24.

The backlight module 20 includes a plurality of red, green, and blue LEDs 23, a reflective film 25, and a diffusing film 29. Each LED 23 includes a light-emitting portion 233, and a base 231 for supporting the light-emitting portion 233. The base 231 is located on the bottom 211 of the frame 21. The diffusing film 29 is adjacent to the liquid crystal panel 24. The reflective film 25 is adjacent to the bottom 211. The reflective film 25 includes a plurality of holes (251) corresponding to the plurality of LEDs 23. A light-mixing space 295 is defined between the reflective film 25 and the diffusing film 29.

The plurality of LEDs 23 emit red, green and blue light beams. Part of the light beams transmit directly to the diffusing film 29, and another part of the light beams transmit to the reflective film 25, and are reflected to the diffusing film 29. The red, green and blue light beams are mixed into white light beams in the light-mixing space 295.

However, if the light-mixing space 295 is small, the red, green and blue light beams may not be perfectly mixed. The mixed white light beams may appear a little yellow or blue, which reduces the color performance of the LCD 2. Therefore, the frame 21 is generally formed to be quite high (thick) in order to enlarge the light-mixing space 295 of the backlight module 20. The thick frame 21 increases a thickness of the LCD 2. This means the LCD 2 may be unsuitable for certain compact applications.

What is needed, therefore, is a backlight module that can overcome the above-described deficiencies.

SUMMARY

In one preferred embodiment, a backlight module includes a plurality of point light sources and a light-mixing member. The plurality of light sources emits light beams of different colors. The light-mixing member mixes the light beams of different colors into white light beams. The light-mixing member includes a light entrance surface opposite to the light-emitting members. The light entrance surface includes a plurality of recesses. The plurality of recesses correspond to the plurality of point light sources.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
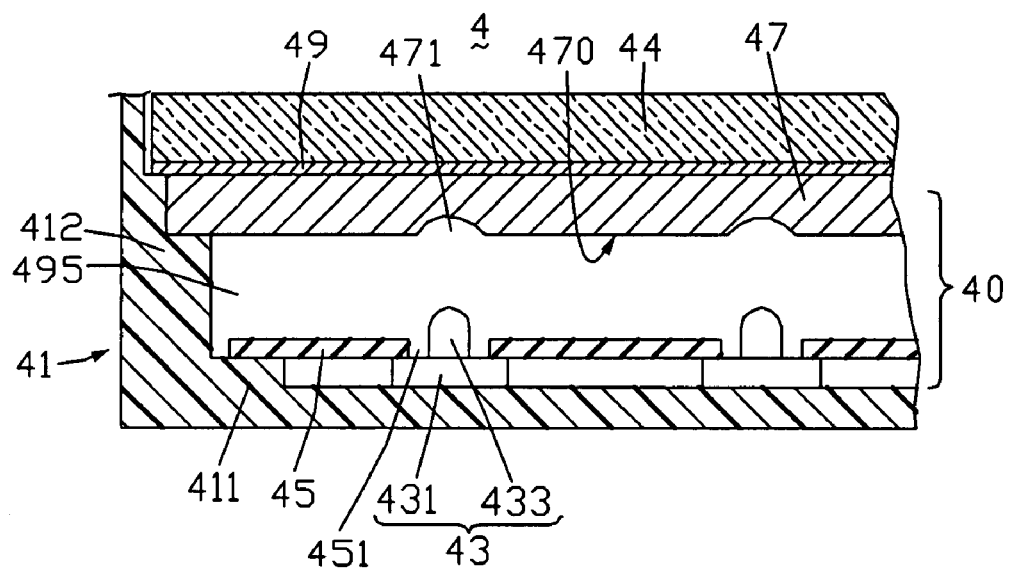
FIG. 1 is a side, cross-sectional view of part of an LCD according to a first embodiment of the present invention, the LCD including a backlight module, the backlight module including a light-mixing plate.

Reference will now be made to the drawing figures to describe various embodiments of the present invention in detail.

Referring to FIG. 1, an LCD 4 according to a first embodiment of the present invention is shown. The LCD 4 includes a liquid crystal panel 44, a direct-type backlight module 40 adjacent to the liquid crystal panel 44 and a frame 41. The backlight module 40 is configured to illuminate the liquid crystal panel 44.

The frame 41 includes a bottom 411 and four side walls 412. The four side walls 412 are perpendicularly connected to the bottom 411, thereby forming an accommodating space. Each of two opposite side walls 412 include an upper first step (not labeled), an intermediate second step (not labeled), and a bottom third step (not labeled). The accommodating space accommodates the backlight module 40 and the liquid crystal panel 44. The backlight module 40 and the liquid crystal panel 44 are supported by the steps.

The backlight module 40 includes a plurality of red, green and blue point light sources 43, a reflective film 45, a light-mixing plate 47, and a diffusing film 49. Typically, the point light sources 43 are LEDs 43. Each LED 43 includes a light-emitting portion 433, and a base 431 for supporting the light-emitting portion 433. The base 431 is located on the bottom 411 of the frame 41. The diffusing film 49 is located adjacent to the liquid crystal panel 44. The diffusing film 49 and the liquid crystal panel 44 are supported by the first steps. The reflective film 45 is located adjacent to the bottom 411, and is supported by the third steps. The reflective film 45 includes a plurality of holes 451 corresponding to the plurality of LEDs 43, with the light-emitting portions 433 protruding up through the holes 451. A light-mixing space 495 is defined between the reflective film 45 and light-mixing plate 47. Light beams are primarily mixed in the light-mixing space 495, and are further mixed in the light-mixing plate 47. The light-mixing plate 47 is supported by the second steps.

Figure 2:
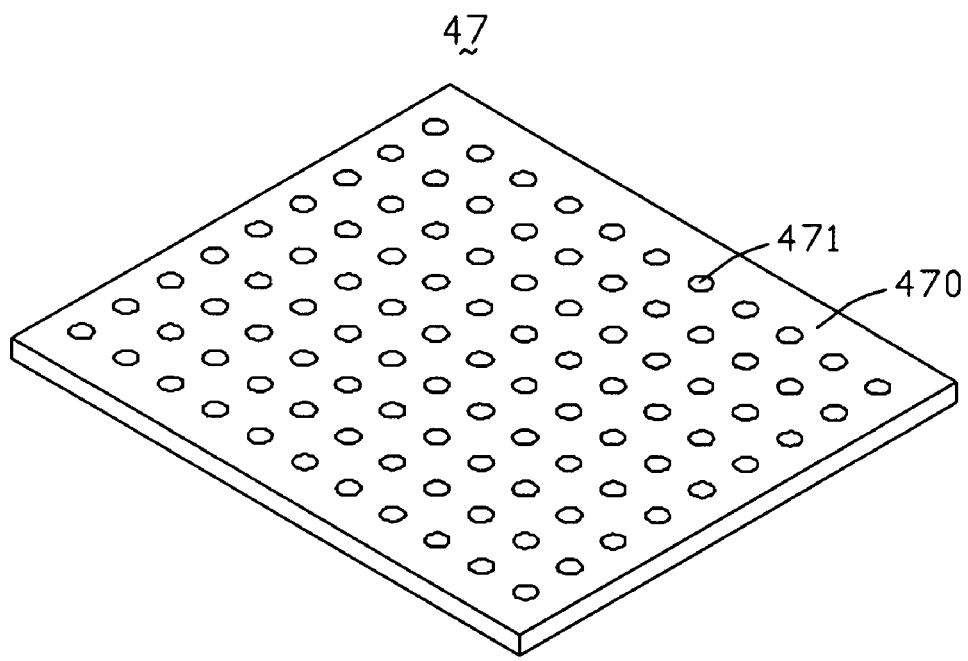
FIG. 2 is an isometric view of the light-mixing plate of FIG. 1, showing the light-mixing plate inverted.

Referring also to FIG. 2, the light-mixing plate 47 is transparent. The light-mixing plate 47 includes a bottom surface 470 adjacent to the light-mixing space 495. The bottom surface 470 serves as a light entrance surface. A plurality of recesses 471 corresponding to the plurality of LEDs 43 are formed at the bottom surface 470. Each recess 471 defines an arcuate cross-section. A refraction index of the light-mixing plate 47 is greater than a refraction index of air in the light-mixing space 495.

Figure 3:
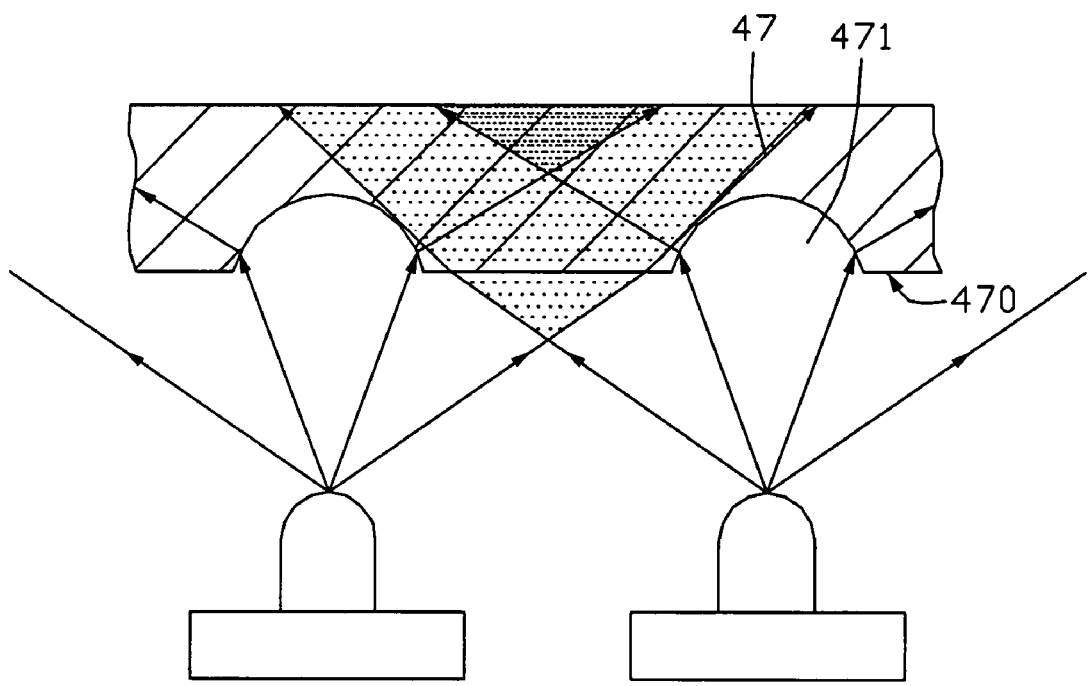
FIG. 3 is an enlarged view of certain parts of the backlight module shown in FIG. 1, showing essential optical paths.

Referring also to FIG. 3, the LEDs 43 emit red, green and blue light beams. Most of the light beams transmit directly towards the light-mixing plate 47. Other of the light beams (not shown) transmit to the reflective film 45, and are reflected to the light-mixing plate 47. Much or most of the red, green and blue light beams are mixed in the light-mixing space 495. However, due to the limited size of the light-mixing space 495, not all the light beams are mixed into white light beams in the light-mixing space 495. That is, some light beams may not cross other light beams of different colors in the light-mixing space 495. Light beams entering the light-mixing plate 47 are refracted at the bottom surface 470, and then transmit into the light-mixing plate 47 and are further mixed therein. Most light beams that transmit into the light-mixing plate 47 through the recesses 471 are refracted and diffused. Therefore overall, light beams which are not mixed in the light-mixing space 495 can be mixed in the light-mixing plate 47, and light beams which are not fully mixed in the light-mixing space 495 can be further mixed in the light-mixing plate 47.

Unlike in a conventional backlight module, the backlight module 40 includes the light-mixing plate 47, and the light-mixing plate 47 includes a plurality of recesses 471 corresponding to the LEDs 43 respectively. The red, green, and blue light beams transmitting through the recesses 471 are refracted and diffused thereat; therefore some or most of such light beams are further mixed in the light-mixing plate 47. The backlight module 40 has high efficiency of light mixing. Therefore the light-mixing space 495 can have a short height and the backlight module 40 can be correspondingly thin. Thus the LCD 4 can have a thin and compact structure.

Figure 4:
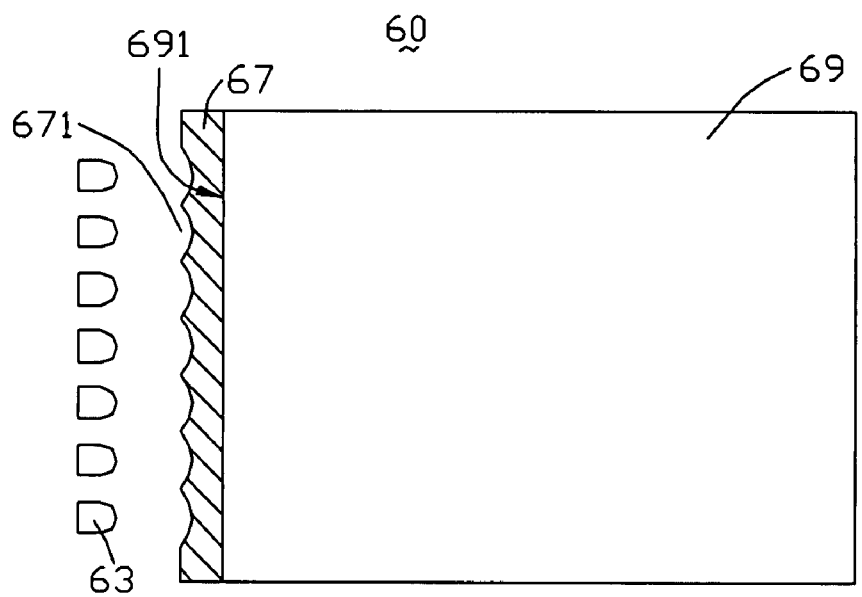
FIG. 4 is a top plan view of a backlight module according to a second embodiment of the present invention.

Referring to FIG. 4, this is a top plan view of a side-type backlight module 60 according to a second embodiment of the present invention. The backlight module 60 includes a plurality of red, green and blue point light sources 63, a light guide plate 69, and a light-mixing plate 67. The light guide plate 69 includes a light entrance surface 691. The light-mixing plate 67 is elongate, and is attached to the light entrance surface 691. Typically, the point light sources 63 are LEDs 63. The plurality of red, green and blue LEDs 63 are located adjacent to the light-mixing plate 67. A plurality of recesses 671 is formed at an outer surface of the light-mixing plate 67, which surface is adjacent to the LEDs 63. The plurality of recesses 671 correspond to the plurality of red, green and blue LEDs 63. The backlight module 60 can achieve advantages similar to the backlight module 40.

Figure 5:
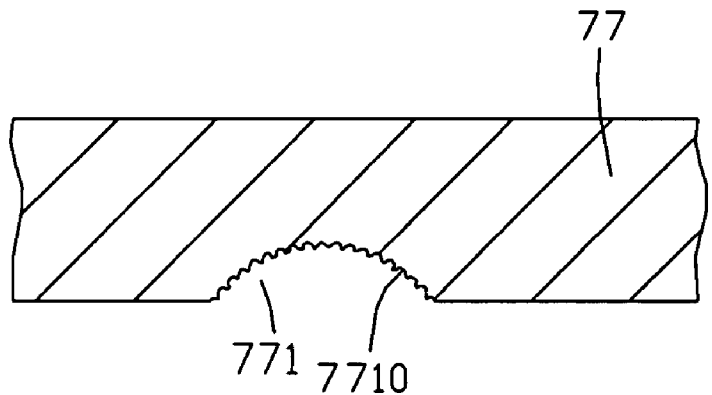
FIG. 5 is a side view of part of a light-mixing plate of a backlight module according to a third embodiment of the present invention.
Figure 6:
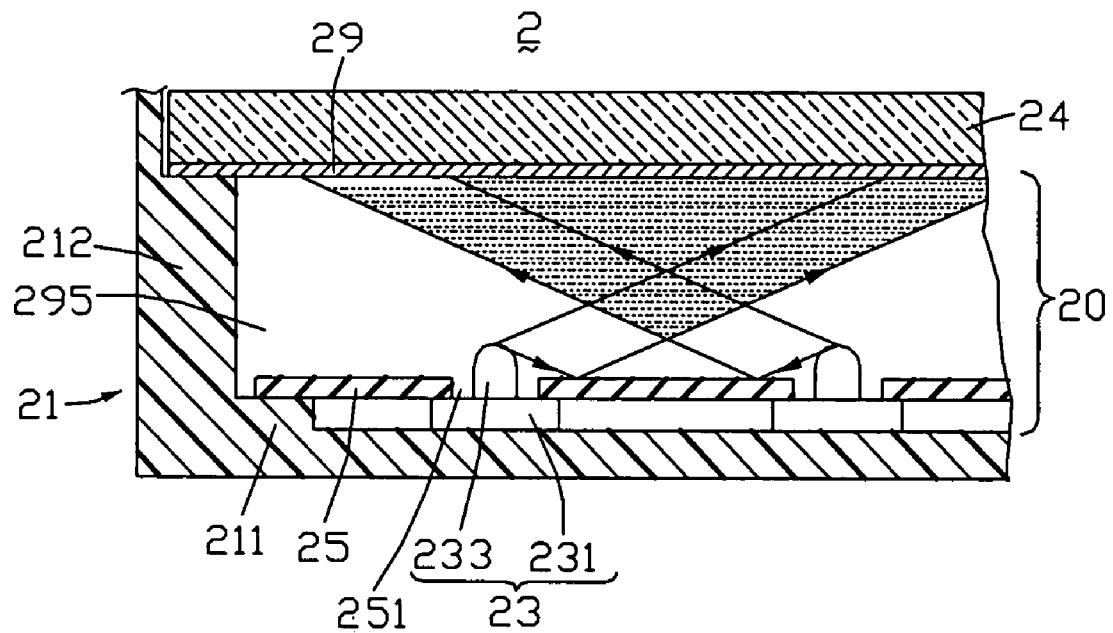
FIG. 6 is a side, cross-sectional view of part of a conventional LCD.

Referring to FIG. 5, this is a side, cross-sectional view of part of a light-mixing plate of a backlight module according to a third embodiment of the present invention. The light-mixing plate 77 is similar to the light-mixing plate 47. However, each recess 771 of the light-mixing plate 77 further includes a plurality of micro recesses 7710 at an inner surfaces thereat. A curvature of each micro recess 7710 is greater than that of the recess 771.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module comprising:
a plurality of point light sources emitting light beams of different colors; and
a light-mixing member configured for mixing the light beams of different colors into white light beams, the light-mixing member comprising a light entrance surface opposite to the plurality of point light sources, the light entrance surface comprising a plurality of recesses formed thereat, the plurality of recesses corresponding to the plurality of point light sources.

2. The backlight module as claimed in claim 1, wherein the point light sources are light-emitting diodes (LEDs).

3. The backlight module as claimed in claim 2, wherein the LEDs are red, green and blue LEDs.

4. The backlight module as claimed in claim 1, wherein the light-mixing member comprises a transparent plate.

5. The backlight module as claimed in claim 4, wherein a refraction index of the light-mixing member is greater than a refraction index of air.

6. The backlight module as claimed in claim 1, wherein each of the recesses defines an arcuate cross-section.

7. The backlight module as claimed in claim 1, wherein the backlight module is a side-type backlight module.

8. The backlight module as claimed in claim 7, further comprising a light guide plate provided adjacent to the light-mixing member, wherein the light-mixing member is an elongate plate, and is located between the light guide plate and the point light sources.

9. A liquid crystal display (LCD) comprising:
a liquid crystal panel;
a backlight module adjacent to the liquid crystal panel, the backlight module comprising a plurality of point light sources emitting light beams of different colors; and
a light-mixing member configured for mixing the light beams of different colors into white light beams, the light-mixing member comprising a light entrance surface opposite to the plurality of point light sources, the light entrance surface comprising a plurality of recesses formed thereat, the plurality of recesses corresponding to the plurality of point light sources.

10. The LCD as claimed in claim 9, wherein the point light sources are red, green and blue light-emitting diodes (LEDs).

11. The LCD as claimed in claim 9, wherein the backlight module is a side-type backlight module.

12. The LCD as claimed in claim 11, wherein the backlight module further comprises a light guide plate provided adjacent to the light-mixing member, the light-mixing member being located between the light guide plate and the plurality of point light sources.

* * * * *